2,948,623

MANNER OF HANDLING MEAT

Thomas R. Anderson, Walnut Creek, Calif., assignor to Swift & Company, Chicago, Ill., a corporation of Illinois No Drawing. Filed Aug. 13, 1958, Ser. No. 754,700

8 Claims. (Cl. 99—169)

This invention relates to an improved manner of handling meats, including carcass meat, primal cuts, and other meat products, to reduce shrinkage attributable to the loss of moisture and to lessen freezer burn in the instance of frozen meats and is a continuation in part of my prior application Serial Number 631,449, filed December 31, 1956, now abandoned.

A major concern of the modern meat packing industry is the control of shrinkage of the meat. These shrinkages result in large monetary losses to those engaged in the supplying of meat especially where the animals are slaughtered and dressed at plants located great distances from the retail outlets. Surface dehydration of a carcass will also impair its color. There are methods of meat processing in which it is particularly desirable to limit the amount of moisture lost from the meat. In the aging of beef, for example, excessive drying of the carcass or primal cut makes it necessary to trim away the dried out surface to place the meat in a salable form.

Normally, the carcass is transferred directly from the killing floor to a chill room where it is held for about 24 hours to reduce its temperature to approximately the temperature of the room, i.e. in the neighborhood of 34–38° F. From the chill room the carcass may be moved into a refrigerated holding room where it is retained until placed in distribution channels or used in the manufacture of a meat product. During the first 24 hours following the slaughter of a steer, the expected shrinkage, even with the maintenance of a high humidity, is considerably in excess of 1%, and in the instance of lamb and pork shrinkages in the vicinity of 2% are common. For each succeeding day that the carcass meat is in the holding room or in the distribution channels there occurs further shrinkage, frequently on the order of 0.2 to 0.3%. Thus it becomes clear why control of shrinkage to the retail distributor, the packer, and all those concerned with the distribution of meat is a problem of great concern.

The consumer demands a product having a good "bloom" and a product with a moist surface. A product possessing a surface which is off-color and which has a dehydrated appearance is less acceptable and may even be unsalable. Bloom refers to the bright fresh appearance of the meat, bone and fat. The red color of uncured meat is dependent upon the presence of an adequate supply of atmospheric oxygen being maintained in contact with the meat. The principal heme pigment of fresh (uncured) meat is myoglobin, which in its reduced, unoxygenated state is purple. When this pigment is exposed to air, molecular oxygen bonds thereto to form oxymyoglobin, which is the bright red pigment commonly associated with fresh meat. The requisite of good "bloom" has made more difficult the finding of a process for reducing shrinkage, especially in the instance of fresh red meats, such as beef.

In the past many materials which apparently had the necessary characteristics, including a favorable rate of moisture transmission, when applied to meat have proven unacceptable. In the reduction of shrinkage there are several problems involved. Obviously the material used must reduce the evaporation of water from the meat. Furthermore, the material when used in connection with fresh meat should permit the passage of atmospheric oxygen to the surface pigments of the meat in order to maintain these heme pigments in their red oxygenated forms. Hence, the material used must have a delicate balance of apparent contradictory characteristics, that is to say, it must be sufficiently moisture-impermeable to justify its use and at the same time it must not only be relatively air-permeable but it must permit the passage of adequate air to maintain the bloom, otherwise the fresh meat will "suffocate" and lose its fresh red appearance, taking on the objectionable gray color of the meat pigment metamyoglobin.

The material used must be non-toxic in the amounts employed and additionally, the material should not impart an objectionable surface or texture to the meat. It should be invisible when applied directly to the meat and it must not adversely affect the meat protein and fat.

Frozen meats are subject to a condition known as "freezer burn." Frozen meats, if unprotected by a suitable flexible film or other packaging material, upon being held at freezing temperatures frequently develop an off-color and sometimes an objectionable surface texture. Because of the likelihood of this condition, frozen meats are today generally covered in some fashion to protect them.

It is an object of the present invention to provide a barrier for reducing moisture loss from meat without adversely affecting its color and texture. Another object is to provide a process for forestalling or lessening "freezer burn" of frozen meats.

It has now been discovered that the holding of meat coated with a thin film of a fatty compound having the formula R—OH, where R is selected from the group consisting of an aliphatic radical or an acyl radical having from 11 to 22 carbon atoms or with a thin film of ethyl stearate will reduce the moisture loss normally experienced in the handling of the meat. The film of the long chain fatty compound is believed to be monomolecular in thickness and may be conveniently formed by the application of an aqueous dispersion of the compound to the meat surface preferably by spraying. The aqueous dispersion is preferably an emulsion of the fatty material in water although the aqueous dispersion may be prepared by dissolving the fatty material in the water with the aid of a common solvent, such as ethyl alcohol. The use of the aqueous dispersion is all-important to the successful application of the material to form an air-permeable moisture-retarding barrier. The suitable materials are waxy, crystalline flakes or needles of high melting points which cannot be satisfactorily applied to the meat, except through an aqueous dispersion, to form the necessary monomolecular film.

The fatty alcohols and fatty acid of the foregoing R—OH formula vary considerably in their effectiveness in the process of the invention. Among the preferred materials are the fatty acids and alcohols having from 16 to 20 carbon atoms inclusive and mixtures of those materials. The $C_{16}$–$C_{20}$ materials will generally be found to provide the greatest resistance to water evaporation. Particularly suitable compounds include octadecanol, hexadecanol (commonly known as cetyl alcohol, stearic acid (octadecanoic acid), and arachidic acid (eicosanoic acid) as well as the ester ethyl stearate. The saturated alcohols and acid are usually more effective than the unsaturated materials of like carbon number; for instance, stearic acid is preferred to oleic acid.

Other fatty acids that may be employed include lauric, tridecylic, myristic, palmitic, margaric acids and the higher fatty acids such as the $C_{20}$ and $C_{22}$ fatty acids. The corresponding alcohols, for example, dodecanol, tridecanol, etc. may be used, but generally, the fatty acids and alcohols, below the $C_{16}$–$C_{20}$ carbon range are less effective than those of that preferred range. Dodecanol, for example, offers a relatively low resistance to moisture evaporation, being less than about one-sixth as effective as cetyl alcohol. Hexadecanol and octadecanol are particularly desirable materials and may be expected to reduce shrinkage from 30–70% of that experienced in their absence. Arachidic acid is also a particularly effective material.

The fatty material forms a thin invisible film on the surface of the meat which is permeable to air thus permitting the maintenance of the bloom on red meats. The material does not adversely affect the protein or fat of the meat nor does it impart an objectionable surface texture. The fatty compounds are readily applied with little labor and their use lessens the need for expensive humidity adjusting equipment. However, the process may be used in conjunction with the maintenance of a high humidity, thereby still further reducing shrinkage loss. The fatty material in the amount needed is inexpensive and is generally effective at the temperatures at which meat is commonly held.

The aqueous emulsion may be prepared in the following manner. Equal weights of cetyl alcohol (hexadecanol) for example, and any of certain edible emulsifying agents are mixed together, after first heating both the emulsifying agent and the cetyl alcohol to a temperature in excess of 49° C. The warm mixture is then agitated with water in a mechanical shaker or a blender until the cetyl alcohol is placed in aqueous emulsion. In an alternative, the emulsifier may be added to the warm water and then heated cetyl alcohol introduced and the mixture shaken to form the emulsion. There are many emulsifiers suitable for use; among these are the edible partial fatty esters of polyhydric alcohols, including propylene glycol and glycerol. The suitable emulsifiers include monoglycerides, diglycerides and mixtures thereof. A preferred emulsifier contains approximately 40% monoglyceride, 40% diglyceride and 20% triglyceride. An esterified mixture of lactic acid and glycerol may also be employed.

It is possible to prepare an aqueous emulsion without the aid of an emulsifier. In this instance, the cetyl alcohol or other material is added to water at an elevated temperature of about 90° C., and the mixture violently shaken or stirred. This will yield an emulsion which will be suitable until the temperature reaches approximately 50° C.; hence, the emulsion should be sprayed immediately or the meat dipped before the temperature has dropped. It is recommended, when using such an emulsion, that a fine orifice spray not be employed. A colloidal mill may be advantageously used for the preparation of the stable emulsion.

The fatty acid, alcohol, or ethyl stearate may be applied in water dispersions of remarkably low concentrations. These materials when applied to the meat surface in a dispersed water phase have the ability of forming an apparently continuous monomolecular film. Concentrations of 50–1000 parts of the fatty material per million (p.p.m.) of water have been profitably employed. However, emulsions of greater and less concentrations may be used with varying degrees of effectiveness.

EXAMPLE I

Fifty (50) mg. of cetyl alcohol (hexadecanol) was dissolved in one ml. of ethyl alcohol and the solution stirred into one liter of water having a temperature of approximately 70° C. Two pieces of beef from the same primal cut were obtained and one was dipped into the aqueous solution. The other piece was used as a control. The results of this experiment with the weights at 0, 24 and 48 hours are shown in Table I following.

The treated sample had a fully acceptable color and texture. No effort was made to adjust the humidity of the refrigerated room.

*Table I*

| | Weight of Sample at— | | | Percent of Shrink | |
|---|---|---|---|---|---|
| | 0 Hours | 24 Hours | 48 Hours | 24 Hours | 48 Hours |
| | grams | grams | grams | | |
| Control Sample | 700 | 693 | 664 | 1.00 | 5.14 |
| Treated Sample | 610 | 607 | 590 | 0.49 | 3.28 |

EXAMPLE II

A ewe carcass was split in half and one-half was sprayed with 75 ml. of 50 p.p.m. of an aqueous cetyl alcohol emulsion. Much excess liquid drained off of the carcass. The emulsifier used was a 40–40–20 mixture of mono-, di-, and triglycerides. The refrigerated space had a low humidity. The results are reported in Table II.

*Table II*

| | Weight of Sample at— | | | Percent of Shrink | |
|---|---|---|---|---|---|
| | 0 Hours | 18 Hours | 42 Hours | 18 Hours | 42 Hours |
| | pounds | pounds | pounds | | |
| Control Sample | 19¾ | 19 | 18¼ | 3.8 | 7.6 |
| Treated Sample | 21½ | 21 | 20½ | 2.3 | 4.6 |

There was no difference in color between the two sides of the split carcass and the meat in all respects presented an acceptable appearance. Aqueous octadecanol or arachidic acid emulsion as well as ethyl stearate emulsions will provide comparable protection. In each instance the emulsion can be prepared as described in either Example I or Example II.

*Table III*

| | Weight of Ewe Sample at | | | Percent of Shrink | |
|---|---|---|---|---|---|
| | 0 Hours | 18 Hours | 42 Hours | 18 Hours | 42 Hours |
| | pounds | pounds | pounds | | |
| Control Sample | 19½ | 18¾ | 18 | 3.9 | 7.7 |
| Octadecanol Sample | 20¼ | 19¾ | 19¼ | 2.5 | 4.9 |
| Arachidic acid Sample | 19¾ | 19¾ | 19 | 1.9 | 3.8 |
| Ethyl stearate Sample | 21¼ | 20¾ | 20¼ | 2.4 | 4.3 |

EXAMPLE III

Two sheep carcasses were selected for this experiment. One liter of 50 p.p.m. of cetyl alcohol dispersed in water was prepared. An amount of oleic acid ester of propylene glycol equal to the weight of the cetyl alcohol was used as the emulsifier. One sheep carcass was sprayed with a portion of the aqueous cetyl alcohol emulsion and together with the control was held for the test period in a refrigerator at a temperature of approximately 38° F. The results of this test are reported in Table IV below.

*Table IV*

| | Weight of Carcass at— | | Percent of Shrink, 24 Hours |
|---|---|---|---|
| | 0 Hours | 24 Hours | |
| Control Carcass | 79 lbs. 6 oz | 77 lbs. 2 oz | 2.83 |
| Treated Carcass | 77 lbs. 14 oz | 76 lbs. 14 oz | 1.28 |

There were no differences in bloom between the test and control carcasses. The data set forth in Table V show that a stearic acid emulsion similarly prepared could generally be expected to provide somewhat less effective protection than the cetyl alcohol used here.

*Table V*

|  | Weight of Carcass at— | | Percent of Shrink, 24 Hours |
|---|---|---|---|
|  | 0 Hours | 24 Hours |  |
| Control Carcass | 84 lbs. 4 oz | 81 lbs. 9 oz | 2.97 |
| Treated Carcass | 82 lbs. 10 oz | 81 lbs. 1 oz | 1.87 |

EXAMPLE IV

The work of this example demonstrates the advantage to be had in the use of cetyl alcohol in connection with frozen meats. Frozen meats frequently exhibit an objectionable off-color and texture described as "freezer burn." Two pieces of beef, unfrozen, were selected and one piece was dipped in a 40 p.p.m. aqueous emulsion of cetyl alcohol. The two samples were placed in an open display retail type freezer and held at 0° F. for 72 hours and at the end of that period the control sample had a freezer burn of a degree that would have made it unsalable. The cetyl alcohol treated meat had an acceptable appearance and evidenced a pronounced improvement in color and texture of the meat surface over the control sample. It is recommended that the aqueous emulsions be applied to the meat before freezing.

EXAMPLE V

Twenty whole, eviscerated broilers were selected and divided into two lots of 10 each. 1.2 gm. of cetyl alcohol was heated to a temperature of 120° F. and to this was added 1 gm. of a heated 40-40-20 mono, di, triglyceride mixture. The mixture of cetyl alcohol and emulsifier was added to 3 gallons of 130° F. water with constant stirring to effect emulsification of the cetyl alcohol in the water. The above solution was cooled to room temperature. The eviscerated whole chickens were removed from an ice slush chill tank and permitted to drain. After draining, 10 of the birds were sprayed internally of the body cavity and externally with the cetyl alcohol emulsion. After spraying, the treated and control birds were ice-packed in the conventional manner and stored at 40° F. for 5 days.

At the end of the 5-day storage period the control birds showed an average shrinkage of 2.3% compared with a shring averaging 1% for the cetyl alcohol treated birds. If the cetyl alcohol had been applied to dry-packed poultry, the advantage from a moisture shrinkage standpoint likely would have been even greater. It is contemplated that it would be particularly desirable to use the fatty alcohols, fatty acids, and ethyl stearate emulsions of the invention on poultry that have been dipped in an antibiotic-containing bath. Such antibiotic-treated birds are not customarily ice-packed, but shipped through distribution channels in a dry condition.

Obviously many modifications and variations of the invention as hereinbefore set forth may be made without departing from the spirit and scope thereof, and therefore only such limitations should be imposed as are indicated in the appended claims.

I claim:
1. A process for handling meat which substantially reduces moisture loss therefrom which comprises maintaining on the surface of the meat an air-permeable moisture-retarding film of a fatty compound selected from the group consisting of ethyl stearate and fatty compounds having the formula R—OH, where R is selected from the group consisting of an aliphatic radical and an acyl radical having from 11 to 22 carbon atoms, whereby the bloom of said meat is maintained.

2. A process in accordance with claim 1 wherein the compound used is hexadecanol.

3. A process in accordance with claim 1 wherein the fatty compound is saturated and the film is monomolecular.

4. A process in accordance with claim 1 wherein the fatty compound is saturated and is maintained in a monomolecular film on fresh, unfrozen meat.

5. A process for the treatment of meat which comprises applying to the surface of the meat an aqueous dispersion of a material selected from the group consisting of ethyl stearate and fatty compounds having the formula R—OH, where R is selected from the group consisting of an aliphatic radical and an acyl radical having from 11 to 22 carbon atoms, said material being present in an amount sufficient to form a thin air-permeable moisture-retarding surface of the meat, and maintaining the film on the surface to obtain a reduction in moisture loss over that normally experienced in the absence of said film, whereby the bloom of said meat is maintained.

6. A process in accordance with claim 5 wherein the material is hexadecanol.

7. A process in accordance with claim 5 wherein the fatty compound is saturated and the film is monomolecular.

8. A process in accordance with claim 5 wherein the fatty compound is saturated and is maintained in a monomolecular film on fresh, unfrozen meat.

References Cited in the file of this patent

UNITED STATES PATENTS

| 1,996,392 | Torrence et al. | Apr. 2, 1935 |
| 2,175,083 | Keil | Oct. 3, 1939 |
| 2,262,238 | Kellermann | Nov. 11, 1941 |
| 2,556,278 | Irvine | June 12, 1951 |
| 2,742,364 | Neumann | Apr. 17, 1956 |
| 2,793,123 | Haas | May 21, 1957 |
| 2,808,421 | Brokaw | Oct. 1, 1957 |

OTHER REFERENCES

The Condensed Chemical Dictionary, 1956, 5th Ed., published by Reinhold Publishing Corp., New York, pp. 105 and 1031.

UNITED STATES PATENT OFFICE
CERTIFICATE OF CORRECTION

Patent No. 2,948,623            August 9, 1960

Thomas R. Anderson

It is hereby certified that error appears in the printed specification of the above numbered patent requiring correction and that the said Letters Patent should read as corrected below.

Column 6, line 31, after "moisture-retarding" insert -- film on the --.

Signed and sealed this 31st day of January 1961.

(SEAL)
Attest:
KARL H. AXLINE
Attesting Officer

ROBERT C. WATSON
Commissioner of Patents